United States Patent
Walter et al.

(10) Patent No.: US 10,798,191 B1
(45) Date of Patent: Oct. 6, 2020

(54) PROCESSOR FOR ANALYZING HETEROGENEOUS DATA STREAMS ACROSS MULTIPLE MODES AND MULTIPLE PARTIES

(71) Applicant: Fuze, Inc., Boston, MA (US)

(72) Inventors: John Walter, Brookline, MA (US); Keith Johnson, Boston, MA (US); Christina Roberts, Boston, MA (US); Jeff Larimer, Somerville, MA (US); Andrew Roberts, Somerville, MA (US)

(73) Assignee: Fuze, Inc., Boston, MA (US)

( * ) Notice: Subject to any disclaimer, the term of this patent is extended or adjusted under 35 U.S.C. 154(b) by 253 days.

(21) Appl. No.: 15/943,655

(22) Filed: Apr. 2, 2018

(51) Int. Cl.
*H04L 29/08* (2006.01)
*G06Q 10/06* (2012.01)
*G06N 20/00* (2019.01)
*G06F 16/23* (2019.01)
*G06F 16/242* (2019.01)

(52) U.S. Cl.
CPC .............. *H04L 67/22* (2013.01); *G06F 16/23* (2019.01); *G06F 16/244* (2019.01); *G06N 20/00* (2019.01); *G06Q 10/063* (2013.01); *H04L 67/146* (2013.01)

(58) Field of Classification Search
CPC ....... H04L 67/22; G06F 16/23; G06F 16/244; G06N 20/00; G06Q 10/063
USPC ....................................................... 709/224
See application file for complete search history.

(56) References Cited

U.S. PATENT DOCUMENTS

| | | | |
|---|---|---|---|
| 2005/0135333 A1* | 6/2005 | Rojas ...................... | H04L 51/04 370/352 |
| 2013/0086380 A1* | 4/2013 | Krishnaswamy ....... | H04L 63/08 713/168 |
| 2014/0310345 A1* | 10/2014 | Megiddo ............... | G06F 15/163 709/204 |
| 2016/0212266 A1* | 7/2016 | Soundar .............. | H04M 3/5235 |
| 2019/0138653 A1* | 5/2019 | Roller ................... | G06T 11/206 |

* cited by examiner

*Primary Examiner* — Meng Vang
(74) *Attorney, Agent, or Firm* — McDermott Will & Emery LLP

(57) ABSTRACT

A method including identifying an interaction between two parties, the interaction hosted by a remote server, is provided. The method includes identifying a first mode from a provider for the interaction by the two parties from multiple modes provided by the remote server, and obtaining, from the remote server, an identification for each of the parties, the identification being associated with the mode. The method includes identifying a duration of the interaction for each of the at least two parties and associating the interaction with an asynchronous interaction in a second communication mode from a second provider having a common identification with one of the parties. The method includes storing, in a database, a record of the interaction event that includes the first mode, the identification for each of the at least two parties, and the duration of the interaction for each of the at least two parties.

20 Claims, 6 Drawing Sheets

PROCESSOR FOR ANALYZING HETEROGENEOUS DATA STREAMS ACROSS MULTIPLE MODES AND MULTIPLE PARTIES

BACKGROUND

Field

The present disclosure generally relates to managing and extracting information from heterogeneous modes of business communication (e.g., "interactions") across multiple platforms and multiple parties. More specifically, the present disclosure relates to devices and systems configured to generate metadata associated with said interactions.

Description of the Related Art

Current solutions for generating metadata associated with business communication between two or more participants in an organization are specialized to the mode of communication used by the participants. For interaction events taking place over two or more modes of communication (e.g., voice, video, chat, and the like), it is customary to request access and permission to the different hosts of the communication platforms for storing and analyzing the related data. In addition, different communication platforms follow different protocols that may be incompatible in certain scenarios, thereby causing loss of data, and extra data manipulation and processing time.

SUMMARY

In one embodiment of the present disclosure, a computer-implemented method is described for identifying an interaction event between at least two parties, the interaction event hosted by a remote server. The computer-implemented method also includes identifying a first communication mode from a first communication mode provider selected for the interaction event by the at least two parties from multiple communication modes provided by the remote server, and obtaining, from the remote server, an identification for each of the at least two parties, the identification being associated with the first communication mode. The computer-implemented method also includes identifying a duration of the interaction event for each of the at least two parties and associating the interaction event with an asynchronous interaction event in a second communication mode from a second communication mode provider having a common identification with one of the at least two parties, the asynchronous interaction event stored in an entry of a database. The computer-implemented method also includes storing, in the entry of the database, a record of the interaction event that includes the first communication mode, the identification for each of the at least two parties, and the duration of the interaction event for each of the at least two parties and providing access to at least a portion of the database selected by an authorized user other than the at least two parties.

According to one embodiment, a system is described that includes one or more processors and a memory coupled to the one or more processors, the memory including instructions that, when executed by the one or more processors, cause the one or more processors to identify an interaction event between at least two parties, the interaction event hosted by a remote server. The one or more processors further execute instructions to identify a first communication mode from a first communication mode provider selected for the interaction event by the at least two parties from multiple communication modes provided by the remote server, to obtain, from the remote server, an identification for each of the at least two parties, the identification being associated with the first communication mode, and to identify a duration of the interaction event for each of the at least two parties. The one or more processors further execute instructions to associate the interaction event with an asynchronous interaction event in a second communication mode from a second communication mode provider having a common identification with one of the at least two parties, the asynchronous interaction event stored in an entry of a database. The one or more processors also execute instructions to store, in the entry of the database, a record of the interaction event that includes the first communication mode, the identification for each of the at least two parties, and the duration of the interaction event for each of the at least two parties. The one or more processors also execute instructions to correlate the identification for each of the at least two parties with a second identification for one of the at least two parties based on a second communication mode hosted by the remote serve and to provide access to at least a portion of the database selected by an authorized user other than the at least two parties r.

According to one embodiment, a non-transitory, machine readable medium is described that includes instructions, which when executed by one or more processors, cause a computer to perform a method. The method includes identifying an interaction event between at least two parties, the interaction event hosted by a remote server, and identifying a first communication mode from a first communication mode provider selected for the interaction event by the at least two parties from multiple communication modes provided by the remote server. The method also includes obtaining, from the remote server, an identification for each of the at least two parties, the identification being associated with the first communication mode, identifying a duration of the interaction event for each of the at least two parties and associating the interaction event with an asynchronous interaction event in a second communication mode from a second communication mode provider having a common identification with one of the at least two parties, the asynchronous interaction event stored in an entry of a database. The method also includes storing, in the entry of the database, a record of the interaction event that includes the first communication mode, the identification for each of the at least two parties, and the duration of the interaction event for each of the at least two parties. The method also includes correlating the identification for each of the at least two parties with a second identification for one of the at least two parties based on a second communication mode hosted by the remote server. The method also includes correlating the identification for each of the at least two parties with a second identification for one of the at least two parties based on a second communication mode hosted by the remote server.

In yet another embodiment, a system is described that includes a means for storing commands and a means for executing the commands causing the system to perform a method including identifying an interaction event between at least two parties, the interaction event hosted by a remote server, and identifying a first communication mode from a first communication mode provider selected for the interaction event by the at least two parties from multiple communication modes provided by the remote server. The method also includes obtaining, from the remote server, an identification for each of the at least two parties, the identification being associated with the first communication mode, identifying a duration of the interaction event for each of the at least two parties and associating the interaction event with an asynchronous interaction event in a second communication mode from a second communication mode provider having a common identification with one of the at least two parties, the asynchronous interaction event stored in an entry of a database. The method also includes storing, in the entry of the database, a record of the interaction event that includes the communication mode, the identification for each of the at least two parties, and the duration of the interaction event for each of the at least two parties. The method also includes correlating the identification for each of the at least two parties with a second identification for one of the at least two parties based on a second communication mode hosted by the remote server, and correlating the identification for each of the at least two parties with a second identification for one of the at least two parties based on a second communication mode hosted by the remote server.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
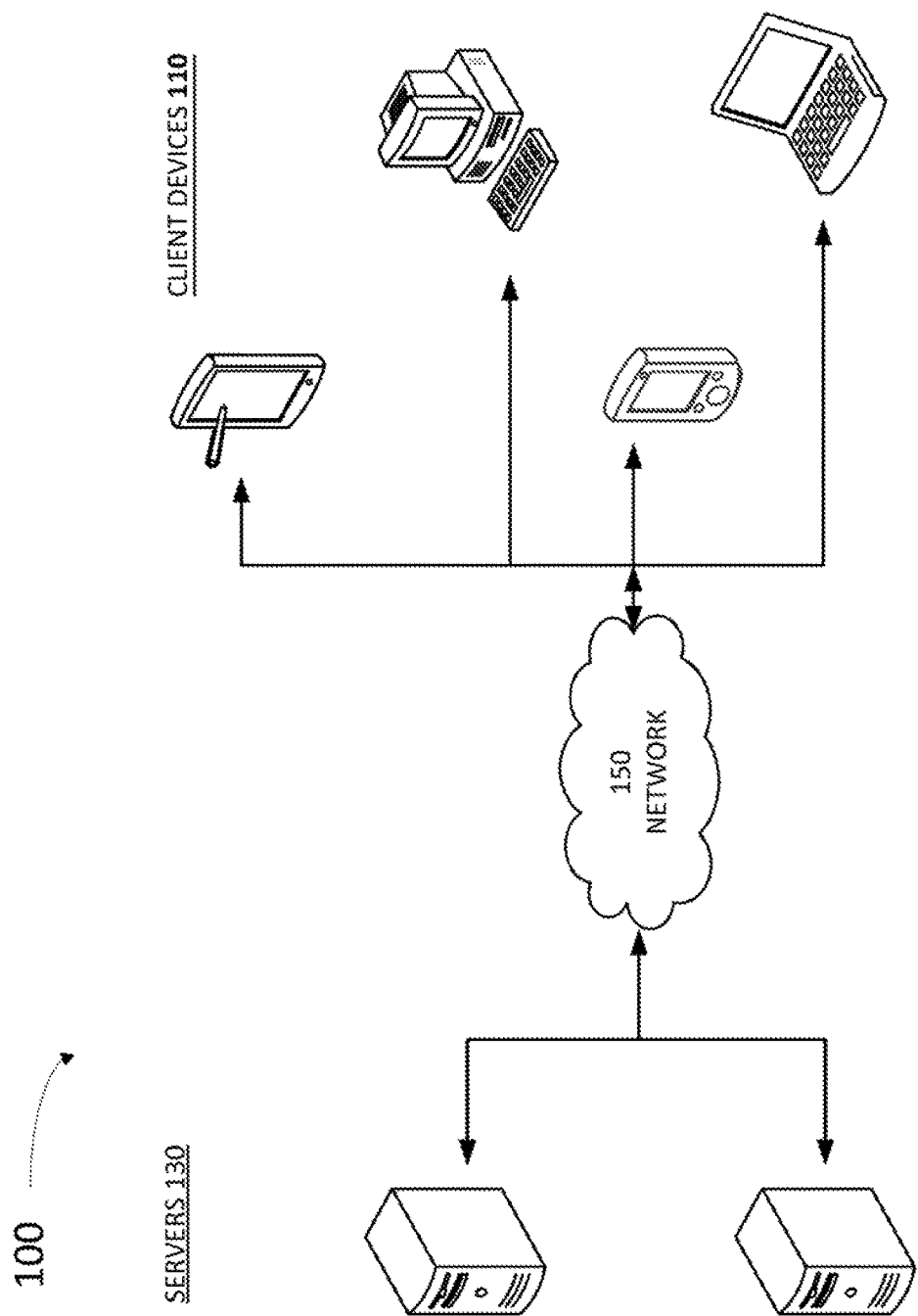
FIG. 1 illustrates an example architecture suitable to provide a mode for analyzing heterogeneous data streams across multiple modes and multiple parties, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Business communication leverages a broad range of communication modes: voice calls, meetings, email, messages, etc. Each of these different modes can be broken down further into different scenarios: one-to-one messaging vs. group messaging, video meetings vs. conference calls, attended transfers and call-centers, etc. And each of these scenarios typically involves 2-N parties.

Typically, these different types of interactions are described using different models, specific to the requirements of a given communication mode. Embodiments as disclosed herein include an analysis platform with shared interaction, participant, and content models that can be used to describe metadata for multiple business communication modes/scenarios (e.g., telephonic, video conferencing, chatroom, and the like).

Embodiments as disclosed herein allow for multi-tenant data access and isolation for processing. In some embodiments, an interaction model considers interactions spanning multiple accounts, resulting in a compartmentalized view of interactions specific to a particular customer.

Embodiments as disclosed herein include methods for processing and analyzing heterogeneous streams of business communications data across multiple customers/accounts in real time. Working with voice, meeting, messaging and email data, some embodiments transform multi-partite interactions into a common interaction/participant model encompassing all modes of business communication. This metadata is then used to create a single, complete view of actual communications activity and patterns across organizations, departments, or individual users.

Data structures used to handle heterogeneous data streams across multiple modes, as disclosed herein, may include interactions that can vary in type, and modes. Instantaneous modes include messaging and email, while other modes are durational, such as calls and meetings. Interactions are also associated with a given account, which allows for account-specific data access when necessary.

In some embodiments, a data structure for an interaction event between at least two parties may include a record, an interaction identifier, and a type of interaction (e.g., voice, meeting, message, email, and the like). In some embodiments, a type of interaction, e.g., a video conference, may include more than one content bundle (e.g., a video recording and a message text, which may further include a chat history). A data structure may also include an account number, associated with at least one of the two parties, and a start time value that indicates the date/time in which an interaction was initiated. The data structure may also include an end time value that indicates the date/time in which an interaction was completed, a participant value that indicates a list of parties involved in the interaction, and a content value including pointers (e.g., a link to one or more content bundles created as part of the interaction). In some embodiments, content bundles can include a voice recording, a video recording, a shared content such as a message text, and the like.

In some embodiments, an interaction event with heterogeneous data streams across multiple modes may include participant objects such as an internal flag that indicates if the participant is associated with the interaction account. A type, indicating whether the party is a person, a resource (e.g., conference room), a service (e.g., front desk), or anonymous. Other participant objects may include a unique participant identifier, a sequence indicating an order in which a participant is involved in the interaction, and a role that describes how the participant is involved in the interaction (e.g., Caller, Host, Participant, Recipient, and the like). The participant objects may also include a duration that indicates which portion of a non-instantaneous interaction (e.g., a meeting or a call) a participant was involved in. In some embodiments, the duration is based on the difference between a "connection time" value and a "disconnection time" value for the specific participant. The "connection time" value describes when the individual participant joins the interaction event. The "disconnection time" value describes when the individual participant exits the interaction event. The participant objects may also include a result that describes the outcome of a given interaction (e.g., Connected, Answered, Transferred, Voice Mail, and the like).

The disclosed system addresses the problem of storing and managing heterogeneous data streams, specifically arising in the realm of computer and network technology by providing a solution also rooted in computer technology, namely, by considering a centralized data collection system that generates data structures having pointers and definitions that address the multiple communication modes used in the heterogeneous data streams.

Example System Architecture

FIG. 1 illustrates an example architecture 100, suitable to provide a mode for a collaborative communication event, according to some embodiments. Architecture 100 includes servers 130 and client devices 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a collaborative communication event that a participant may access through client device 110. Further, in some embodiments, the processor in server 130 is configured to provide documents including images, videos, and text messaging services to a participant in a collaborative communication event through client device 110. In some embodiments, the documents provided by server 130 to one or more parties may include an application-based document (e.g., a text-rich document such as a Word document, a PDF document, or any other document accessible through a text editing application, including a computer code sequence, and the like), a spreadsheet document (e.g., Excel and the like), a presentation document (e.g., PowerPoint and the like), an XML file, an HTML file, a multi-media file such as a video, audio, or image file, or any combination of the above. Information related to, and instructions to handle the collaborative communication event may be stored in a communications engine 242, accessible by a participant through a client device 110 (e.g., accessible through a web page or an application 222 running on client device 110). Servers 130 can return images, documents, rich-text documents, and the like intended for a shared use and modification by multiple parties in a collaborative communication event. For purposes of load balancing, multiple servers 130 can host memories, including instructions to one or more processors and multiple servers 130 for hosting one or more collaborative communication events as disclosed herein.

Servers 130 may include any device having an appropriate processor, memory, and communications capability for hosting the documents and applications associated with communications engine 242. Communications engine 242 may be accessible by multiple parties through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing communications engine 242 on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

In some embodiments, at least one of servers 130 is an analysis platform that processes data directly from other servers 130 in the systems, without directly communicating with client devices 110.

Figure 2:
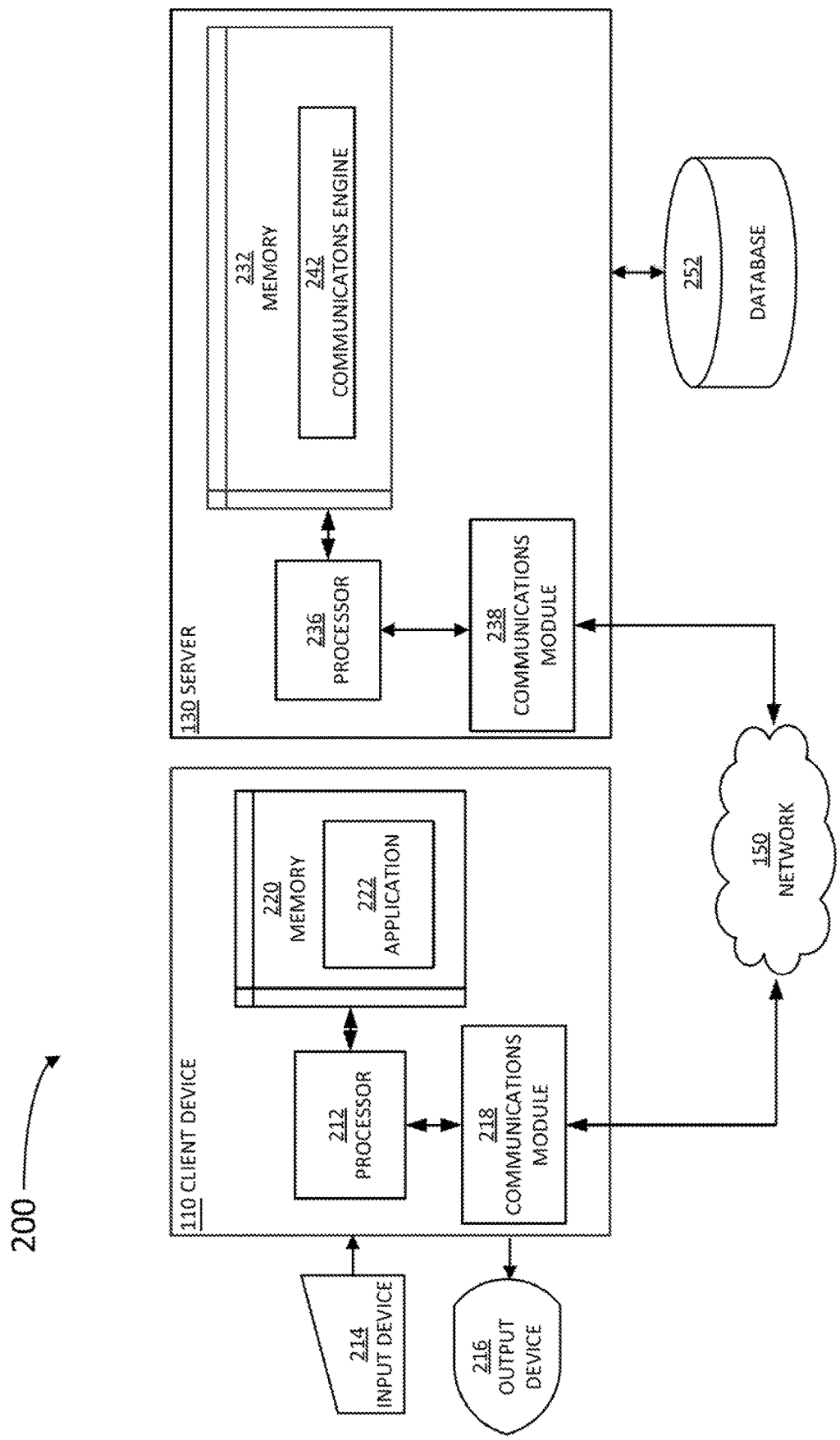
FIG. 2 is a block diagram illustrating an example server and client from the architecture of FIG. 1, according to certain aspects of the disclosure.

FIG. 2 is a block diagram 200 illustrating an example server 130 and client device 110 in the architecture 100 of FIG. 1, according to certain aspects of the disclosure. Client device 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Client device 110 may be any one of a desktop computer, a laptop, or a mobile computing device. Client device 110 may include a processor 212 and a memory 220. An input device 214 and an output device 216 enable the user to interact with client device 110. Examples of input device 214 and output device 216 may include a mouse, a keyboard, a display, a touch-interactive display, and the like.

Server 130 includes a memory 232, a processor 236, and communications module 238. The user interface is displayed for the user in an output device 216 of client device 110. Memory 232 includes a communications engine 242. Communications engine 242 includes instructions which, when executed by processor 236, cause server 130 to perform at least partially steps as disclosed herein. For example, communications engine 242 includes instructions to communicate with application 222 to incorporate the user of client device 110 into a collaborative communication event as disclosed herein. Communications engine 242 may also include instructions to store a history log and other data related to a collaborative communication event as disclosed herein into a database 252. Furthermore, in some embodiments, communications engine 242 may include instructions to retrieve at least some of the data in database 252 and provide to one or more parties in a collaborative communication event as disclosed herein. In some embodiments, database 252 may be internal to server 130, and in some embodiments, database 252 may be external and communicatively coupled to server 130.

In some embodiments, server 130 is an analysis platform, including a cluster of servers that receive data from communications engine 242 and store interaction information in database 252.

In some embodiments, communications engine 242 stores data in, and maintains for a selected period of time, database 252. Further, communications engine 242 updates different changes and modifications on a document or file discussed during the collaborative communication event, as part of a chat/topic history, as stored in database 252. In some embodiments, the activity, notes, and other actions taken by different parties over a document or any other topic item are displayed around the item, showing the specific participant that has participated in the activity. As mentioned above, the document stored by server 130 in database 252 may include an application-based document (e.g., a text-rich document such as a Word document, a PDF document, or any other document accessible through a text editing application, including a computer code sequence, and the like), a spreadsheet document (e.g., Excel and the like), a presentation document (e.g., PowerPoint and the like), an XML file, an HTML file, or a multi-media file such as a video, audio, image file, or any combination of the above.

The user may access communications engine 242 through application 222, installed in memory 220 of client device 110. The user may also access communications engine 242 via a web browser installed in client device 110. Execution of application 222 may be controlled by a processor 212 in client device 110. In some embodiments, application 222 is downloaded and installed by the user into client device 110, from server 130.

Processor 236 is configured to execute instructions, such as instructions physically coded into processor 236, instructions received from software in memory 232, or a combination of both. A user of client device 110 may use input device 214 to submit a document or a media file to communications engine 242 via a user interface of application 222. The document submitted by the user may include an application-based document (e.g., a text-rich document such as a Word document, a PDF document, or any other document accessible through a text editing application, including a computer code sequence, and the like), a spreadsheet document (e.g., Excel and the like), a presentation document (e.g., PowerPoint and the like), an XML file, an HTML file, or a multi-media file such as a video, audio, image file, or any combination of the above.

Figure 3A:
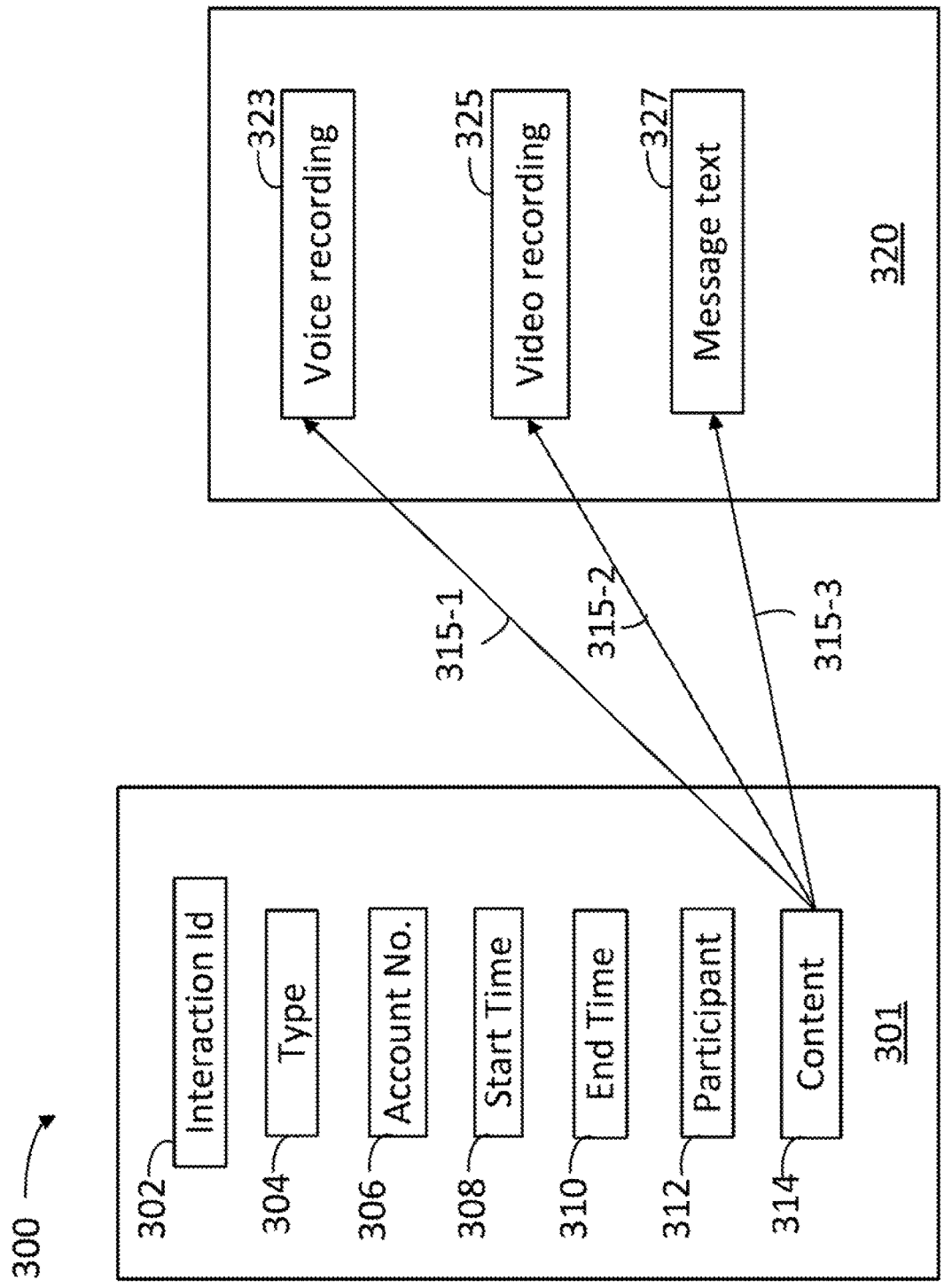
FIGS. 3A-B illustrate data structures used to handle heterogeneous data streams across multiple modes, according to some embodiments.
Figure 3B:
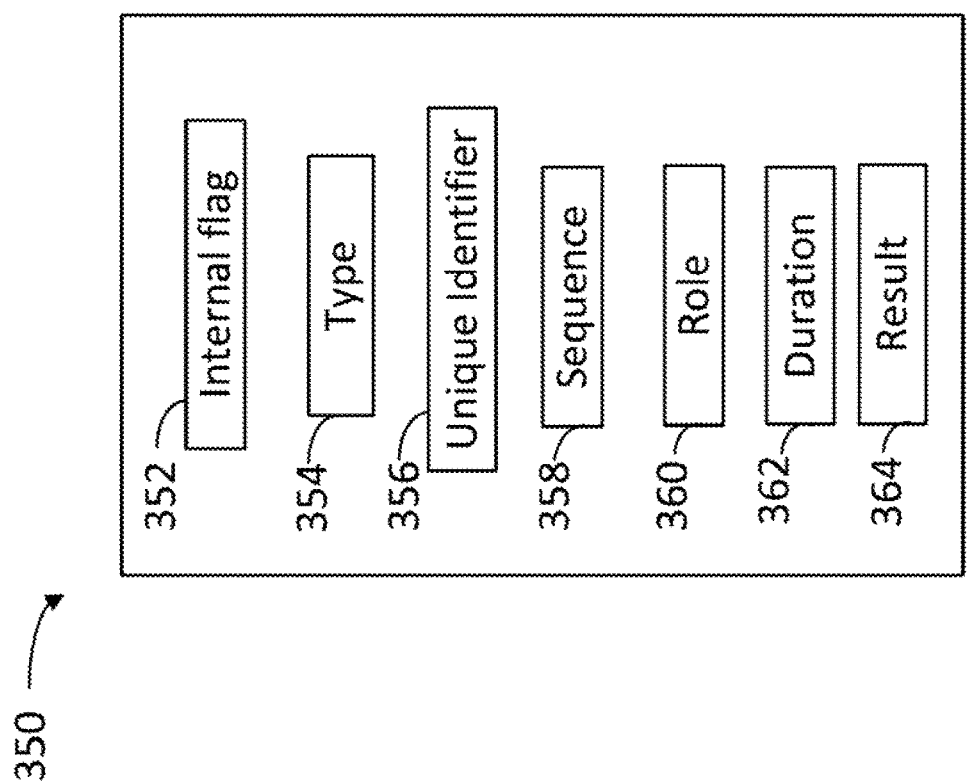

FIGS. 3A-B illustrate data structures used to handle heterogeneous data streams across multiple modes, according to some embodiments. Interactions can vary in type, and modes such as messaging and email are instantaneous, while other modes, such as calls and meetings, have a duration. Interactions are also associated with a given account, which allows for account-specific data access when necessary. In the case of interactions spanning more than a single account, separate interaction objects are created, one for each account involved. Finally, all interactions are comprised of two or more parties' objects, and zero to many content objects.

FIG. 3A illustrates a record 301 in a data structure 300 for an interaction event between at least two parties over one of multiple modes, according to some embodiments. An interaction ID 302 is an interaction identifier. A type 304 describes the type of interaction. Potential values for type 304 include voice, meeting, message, email, and the like. An account number 306 indicates an account associated with interaction ID 302. In some embodiments, the same interaction ID 302 may be combined with multiple account numbers 306. For example, for cross-account interactions involving N different accounts in the same interaction event, there will be N copies of the same interaction ID 302, each copy associated with a different account number 306.

A start time value 308 indicates the date/time in which an interaction was initiated. An end time value 310 indicates the date/time in which an interaction was completed. A participant value 312 indicates a list of parties involved in the interaction. A content value 314 includes pointers 315-1, 315-2, and 315-3 (hereinafter, collectively referred to as "pointers 315"), to block 320. More specifically, pointers 315 may provide a link to one or more content bundles 323, 325, and 327 created as part of the interaction, and including relevant interaction event content, in block 320. In some embodiments, content bundles can include a voice recording 323, a video recording 325, a shared content such as a message text 327, and the like. In some embodiments, a type of interaction, e.g., a video conference, may include more than one content bundle (e.g., a video recording 325 and a message text 327, which may further include a chat history).

Pointers 315 in content 314 may include a 'type' portion, to indicate the type of content (e.g., voice recording, video recording, shared files, message content, and the like), and a 'location' portion, indicating a location for the raw content (e.g., a location within database 252).

FIG. 3B illustrates participant objects 350 in an interaction event with heterogeneous data streams across multiple modes, according to some embodiments. An internal flag 352 indicates if the participant is associated with the interaction account. A type 354 indicates whether the party is a person, a resource (e.g., conference room), a service (e.g., front desk), or anonymous. In some embodiments, type 354 may include values such as "Person," "Resource," "Service," or "Anonymous." A unique identifier 356 is a unique participant identifier and may take different formats, including: user ID, DIDs, email addresses, and the like. A sequence 358 may indicate an order in which a participant is involved in the interaction (e.g., a second participant forwarding a call to a third participant, and the like). In some embodiments, values of sequence 358 are used with Voice type of interactions (e.g., audio, video). A role 360 describes how the participant is involved in the interaction (e.g., Caller, Host, Participant, Recipient, and the like). A duration 362 indicates which portion of a non-instantaneous interaction (e.g., a meeting or a call) a participant was involved in. In some embodiments, duration 362 is based on the difference between a "connection time" value and a "disconnection time" value for the specific participant. The "connection time" value describes when the individual participant joins the interaction event. The "disconnection time" value describes when the individual participant exits the interaction event. A result 364 describes the outcome of a given interaction (e.g., Connected, Answered, Transferred, Voice Mail, and the like).

Note that participant objects are also relative to the account associated with a particular interaction. Accordingly, for an interaction that spans multiple accounts, unique interaction objects are created for each account. For example, if user A from account A calls user B from account B, then separate interaction records will be created for account A and account B. And within those records, the participant user A will be described differently, i.e., for the account A interaction record, user A will be identified as type=internal, but for the account B interaction record, user A may be type=external or type=anonymous.

Figure 4:
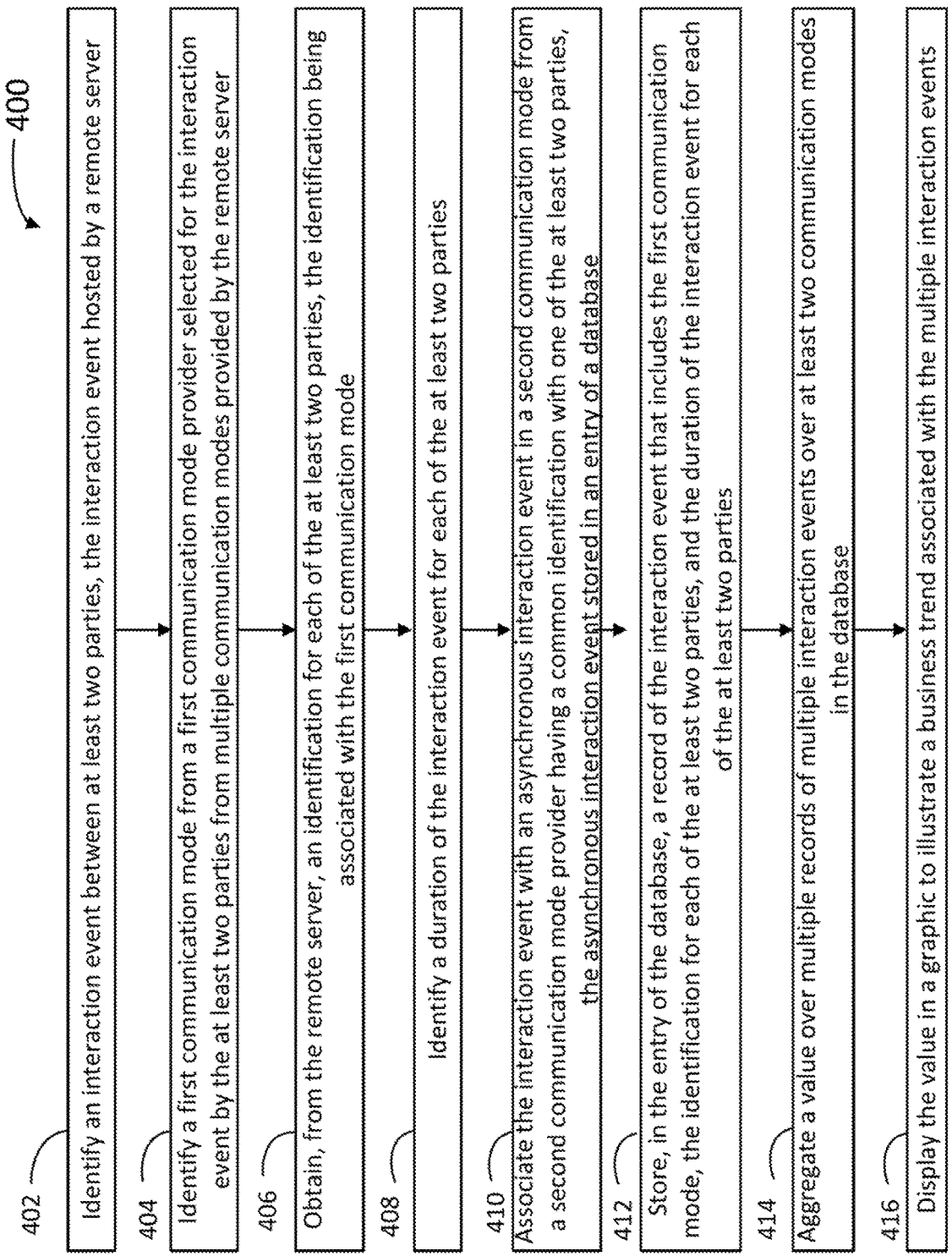
FIG. 4 is a flowchart illustrating steps in a method to form a data structure for analyzing records of interaction events over multiple communication modes, according to some embodiments.

FIG. 4 is a flowchart illustrating steps in a method 400 to form a data structure for analyzing records of interaction events over multiple communication modes, according to some embodiments. In some embodiments, a processor may execute commands stored in a memory, such that the processor, when executing the commands, causes a computer to perform at least partially some of the steps in method 400. The computer, the processor, and the memory may include a client device or a network server, communicably coupled via a network, as disclosed herein (e.g., client device 110, server 130, processors 212 and 236, memories 220 and 232, and network 150). In some embodiments, the server may include in the memory a communications engine and a database (e.g., communications engine 242, database 252). The communications engine may perform at least partially some of the steps in method 400, in collaboration with the database. Further, in some embodiments, the server may be communicatively coupled with an application installed in the memory of the client device, via a communications module, through the network (e.g., application 222 and communications modules 218 and 238). The application may be configured to handle the interaction event between multiple users with multiple client devices.

Methods consistent with the present disclosure may include one or more of the steps in method 400 performed in a different order. For example, in some embodiments consistent with the present disclosure, a method may include at least some of the steps in method 400 performed overlapping in time, almost simultaneously, or simultaneously.

Step 402 includes identifying an interaction event between at least two parties, the interaction event hosted by a remote server.

Step 404 includes identifying a first communication mode from a first communication mode provider selected for the interaction event by the at least two parties from multiple communication modes provided by the remote server. In some embodiments, step 404 includes identifying two communication modes selected for the interaction event, the two communication modes being hosted by the remote server.

Step 406 includes obtaining, from the remote server, an identification for each of the at least two parties, the identification being associated with the first communication mode. In some embodiments, step 406 includes correlating the identification for each of the at least two parties with a second identification for one of the at least two parties based on a second communication mode hosted by the remote server. In some embodiments, one of the at least two parties switches to a second communication mode during the interaction event, and step 406 includes obtaining a second identification for the one of the at least two parties, the second identification being associated with the second communication mode, and storing the second identification for the one of the at least two parties in the record of the interaction event.

Step 408 includes identifying a duration of the interaction event for each of the at least two parties.

Step 410 includes associating the interaction event with an asynchronous interaction event in a second communication mode from a second communication mode provider having a common identification with one of the at least two parties, the asynchronous interaction event stored in an entry of a database. For example, in some embodiments the first communication mode may include two users communicating with each other via a telephonic line, regarding certain project. Accordingly, step 410 may include associating an e-mail exchange between the same (or different) two users, at a later time, in relation with the same project.

Step 412 includes storing, in the entry of the database, a record of the interaction event that includes the first communication mode, the identification for each of the at least two parties, and the duration of the interaction event for each of the at least two parties. In the above example, step 412 may include storing metadata associated with the telephonic conversation between the first two users in the same memory registry as metadata associated with the e-mail exchange between the same (or different) two users. In some embodiments, step 412 includes adding, to the record of the interaction event, a pointer to data content, the data content including at least one of a voice recording, a video recording, a message text, or a chat history. In some embodiments, step 412 includes storing a result of the interaction event in the record of the interaction event.

Step 414 includes aggregating a value over multiple records of multiple interaction events over at least two communication modes in the database. In some embodiments, step 414 includes aggregating the value over a period of time, displaying the value in a graphic to illustrate a business trend, and illustrating a communication mode usage trend associated with the multiple interaction events over the period of time. In some embodiments, step 414 includes aggregating asynchronous information associated with the interaction event. In some embodiments, step 414 includes determining an indicator value by accessing at least some information in the record of the interaction event and aggregating the at least some information over multiple records in the database to obtain an indicator with a machine learning algorithm.

Step 416 includes displaying the value in a graphic to illustrate a business trend associated with the multiple interaction events. A business trend may include, for example, a probability of increased contract closures by the end of the month, or an increase in complaints regarding a certain line of products, which may indicate a future loss of revenue. In some embodiments, e.g., associated with the healthcare industry, a business trend may indicate the emergence of an endemic disease, an outbreak of a health crisis, or a potential increase/decrease and shortage/surplus of vaccination doses. In some embodiments, step 416 includes receiving, from a user, a selection of a portion of the graphic, and providing, to the user, additional details regarding interaction events represented by the portion of the graphic.

Hardware Overview

Figure 5:
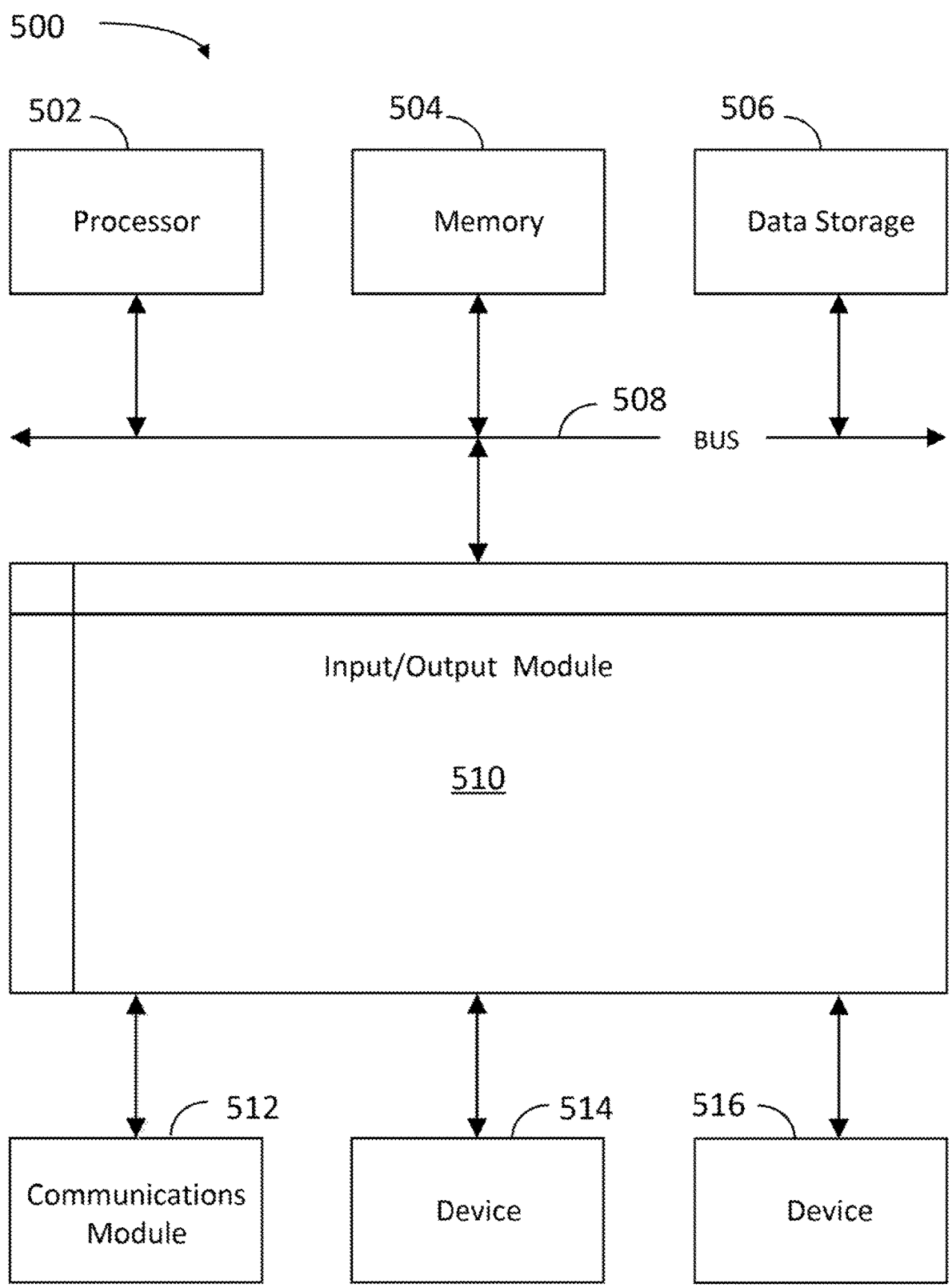
FIG. 5 is a block diagram illustrating an example computer system with which the client and server of FIGS. 1 and 2 and the method of FIG. 4 can be implemented, according to some embodiments.

FIG. 5 is a block diagram illustrating an exemplary computer system 500 with which the client device 110 and server 130 of FIGS. 1 and 2, and the methods of FIG. 4 can be implemented. In certain aspects, the computer system 500 may be implemented using hardware or a combination of software and hardware, either in a dedicated server, or integrated into another entity, or distributed across multiple entities.

Computer system 500 (e.g., client device 110 and server 130) includes a bus 508 or other communication mechanism for communicating information, and a processor 502 (e.g., processors 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, a code that creates an execution environment for the computer program in question, e.g., code that constitutes processor firmware, a protocol stack, a database management system, an operating system, or a combination of one or more of them stored in an included memory 504 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, a special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506, such as a magnetic disk or optical disk, coupled to bus 508 for storing information and instructions. Computer system 500 may be coupled via input/output module 510 to various devices. Input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, input/output module 510 is configured to connect to a plurality of devices, such as an input device 514 (e.g., input device 214) and/or an output device 516 (e.g., output device 216). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, the client device 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship with each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:

identifying an interaction event between at least two parties, the interaction event hosted by a remote server;

identifying a first communication mode from a first communication mode provider selected for the interaction event by the at least two parties from multiple communication modes provided by the remote server;

obtaining, from the remote server, an identification for each of the at least two parties, the identification being associated with the first communication mode;

identifying a duration of the interaction event for each of the at least two parties;

associating the interaction event with an asynchronous interaction event in a second communication mode from a second communication mode provider having a common identification with one of the at least two parties, the asynchronous interaction event stored in an entry of a database;

storing, in the entry of the database, a record of the interaction event that includes the first communication mode, the identification for each of the at least two parties, and the duration of the interaction event for each of the at least two parties;

providing access to at least a portion of the database selected by an authorized user other than the at least two parties;

receiving, from a user, a selection of a graphic display, and providing, to the user, an information from an interaction event represented by the graphic display;

removing the record of the interaction event upon request by one of the at least two parties;

correlating the identification for one of the two parties with a second identification based on a second communication mode used by one of the two parties; and storing the second identification for the one of the at least two parties in the record of the interaction event.

2. The computer-implemented method of claim 1, further comprising aggregating a value over multiple records of multiple interaction events over at least two communication modes in the database and aggregating the value over a period of time, and displaying the value in a graphic to illustrate a business trend comprises illustrating a communication mode usage trend associated with the interaction events over the period of time.

3. The computer-implemented method of claim 1, wherein providing, to the user, an information from an interaction event represented by the graphic display comprises providing an indication of an order in which a participant is involved in the interaction event.

4. The computer-implemented method of claim 1, further comprising aggregating asynchronous information associated with the interaction event.

5. The computer-implemented method of claim 1, further comprising correlating the identification for each of the at least two parties with a second identification for one of the at least two parties based on a second communication mode hosted by the remote server.

6. The computer-implemented method of claim 1, further comprising determining an indicator value by accessing at least some information in the record of the interaction event and aggregating the at least some information over multiple records in the database to obtain an indicator with a machine learning algorithm.

7. The computer-implemented method of claim 1, further comprising including, in the record of the interaction event, a pointer to a data content, the data content comprising at least one of a voice recording, a video recording, a message text, or a chat history.

8. The computer-implemented method of claim 1, wherein identifying the communication mode selected for the interaction event by the at least two parties comprises identifying two communication modes selected for the interaction event, the two communication modes being hosted by the remote server.

9. The computer-implemented method of claim 1, wherein providing, to the user, an information from an interaction event represented by the graphic display comprises providing a connection time value and a disconnection time value for a participant in the interaction event.

10. The computer-implemented method of claim 1, further comprising storing a result of the interaction event in the record of the interaction event.

11. The computer-implemented method of claim 1, wherein providing, to the user, an information from an interaction event represented by the graphic display comprises forming a data structure comprising heterogeneous data streams from multiple modes.

12. A system comprising:
one or more processors; and
a memory coupled to the one or more processors, the memory including instructions that, when executed by the one or more processors, cause the one or more processors to:
identify an interaction event between at least two parties, the interaction event hosted by a remote server;
identify a first communication mode from a first communication mode provider selected for the interaction event by the at least two parties from multiple communication modes provided by the remote server;
obtain, from the remote server, an identification for each of the at least two parties, the identification being associated with the first communication mode;
identify a duration of the interaction event for each of the at least two parties;
associate the interaction event with an asynchronous interaction event in a second communication mode from a second communication mode provider having a common identification with one of the at least two parties, the asynchronous interaction event stored in an entry of a database;
store, in the entry of the database, a record of the interaction event that includes the first communication mode, the identification for each of the at least two parties, and the duration of the interaction event for each of the at least two parties;
provide access to at least a portion of the database selected by an authorized user other than the at least two parties;
receive, from a user, a selection of a graphic display, and providing, to the user, an information from an interaction event represented by the graphic display;
remove the record of the interaction event upon request by one of the at least two parties;
correlate the identification for one of the two parties with a second identification based on a second communication mode used by one of the two parties; and
store the second identification for the one of the at least two parties in the record of the interaction event.

13. The system of claim 12, wherein the one or more processors further executes instructions to aggregate a value over multiple records of multiple interaction events over at least two communication modes in the database the one or more processors execute instructions to aggregate the value over a period of time, and to display the value in a graphic to illustrate a business trend comprises illustrating the business trend over the period of time.

14. The system of claim 12, wherein to provide, to the user, an information from an interaction event represented by the graphic display the one or more processors execute instructions to provide an indication of an order in which a participant is involved in the interaction event.

15. The system of claim 12, wherein the one or more processors further execute instructions to determine an indicator value by accessing at least some information in the record of the interaction event and to aggregate the at least some information over multiple records in the database to obtain an indicator with a machine learning algorithm.

16. The system of claim 12, wherein the one or more processors further execute instructions to include, in the record of the interaction event, a pointer to a data content, the data content comprising at least one of a voice recording, a video recording, a message text, or a chat history.

17. The system of claim 12, wherein the one or more processors further execute instructions to identify the communication mode selected for the interaction event by the at least two parties comprises identifying two communication modes selected for the interaction event, the two communication modes being hosted by the remote server.

18. A non-transitory, computer-readable medium storing instructions which, when executed by a processor, cause a computer to perform a method, the method comprising:
identifying an interaction event between at least two parties, the interaction event hosted by a remote server;
identifying a first communication mode from a first communication mode provider selected for the interaction event by the at least two parties from multiple communication modes provided by the remote server;
obtaining, from the remote server, an identification for each of the at least two parties, the identification being associated with the first communication mode;
identifying a duration of the interaction event for each of the at least two parties;
associating the interaction event with an asynchronous interaction event in a second communication mode from a second communication mode provider having a common identification with one of the at least two parties, the asynchronous interaction event stored in an entry of a database;

storing, in the entry of the database, a record of the interaction event that includes the first communication mode, the identification for each of the at least two parties, and the duration of the interaction event for each of the at least two parties;

receiving, from a user, a selection of a graphic display, and providing, to the user, an information from an interaction event represented by the graphic display;

correlating the identification for each of the at least two parties with a second identification for one of the at least two parties based on a second communication mode hosted by the remote server;

storing the second identification for the one of the at least two parties in the record of the interaction event;

aggregating a value over multiple records of multiple interaction events over at least two communication modes in the database; and displaying the value in a graphic to illustrate a business trend.

19. The non-transitory, computer readable medium of claim 18, wherein the method further comprises determining an indicator value by accessing at least some information in the record of the interaction event and aggregating the at least some information over multiple records in the database to obtain an indicator with a machine learning algorithm.

20. The non-transitory, computer-readable medium of claim 18, wherein the method further comprises including, in the record of the interaction event, a pointer to a data content, the data content comprising at least one of a voice recording, a video recording, a message text, or a chat history.

* * * * *